United States Patent [19]

Townsend

[11] 3,857,372

[45] Dec. 31, 1974

[54] ROTARY INTERNAL COMBUSTION ENGINE

[75] Inventor: Ray T. Townsend, Des Moines, Iowa

[73] Assignee: Townsend Engineering Company, Des Moines, Iowa

[22] Filed: Oct. 26, 1972

[21] Appl. No.: 301,096

Related U.S. Application Data

[63] Continuation-in-part of Ser. No. 286,189, Sept. 5, 1972.

[52] U.S. Cl. ............ 123/44 E, 123/43 C, 123/75 D
[51] Int. Cl. .......................................... F02b 57/00
[58] Field of Search .... 123/44 E, 44 B, 44 C, 44 D, 123/43 C, 75 D

[56] References Cited
UNITED STATES PATENTS

| | | | |
|---|---|---|---|
| 951,388 | 3/1910 | Conill | 123/44 B |
| 1,286,142 | 11/1918 | Tacchi | 123/44 B |
| 1,653,877 | 12/1927 | Schaff | 123/75 D |
| 2,774,341 | 12/1956 | Morse | 123/44 B |
| 2,807,248 | 9/1957 | Maloney | 123/44 E |
| 3,161,183 | 12/1964 | Leath | 123/43 C |
| 3,604,406 | 9/1971 | Hottelet | 123/44 E |

FOREIGN PATENTS OR APPLICATIONS

| | | | |
|---|---|---|---|
| 368,775 | 2/1923 | Germany | 123/75 D |

Primary Examiner—C. J. Husar
Attorney, Agent, or Firm—Zarley, McKee & Thomte

[57] ABSTRACT

A rotary internal combustion engine which employs a cam plate with a cam surface having a lobe thereon with a flattened portion to provide a piston dwell time. In another embodiment means to provide air to the cylinders following combustion to exhaust the gases from the cylinders, is disclosed.

33 Claims, 23 Drawing Figures

ROTARY INTERNAL COMBUSTION ENGINE

This application is a continuation-in-part of co-pending application Ser. No. 286,189 filed Sept. 5, 1972.

BACKGROUND OF THE INVENTION

In diesel engines, fuel oil or the like is sprayed or injected into the cylinder after the air therein has been compressed to about 1000° F., thus causing the ignition of the oil. Since the compression in a diesel is controlled by a crank instead of a cam, the exact point at which the fuel mixture attains firing temperature will vary considerably so that accurate timing cannot be maintained. Therefore, in a crank-type diesel, it is necessary to compress only the air and use the fuel injection to time the firing. This means that the fuel cannot be injected until near the firing point therefore causing the fuel to burn quite slowly due to the time required for volatizing and burning. The slow burning referred to above it not necessarily a disadvantage in a crank-type engine, because, due to the crank action, the pistons cannot be expanded rapidly and it is preferable to let the pressure and heat continue to build up well past top center where the crank has attained a position of considerable leverage.

Generally speaking, many rotary engines use a valve plate or port system for timing the various cycles of the engine. These conventional rotary engines exhaust the exhaust gases through the valve plate which creates a serious heat problem thereby making it very difficult to keep the valve faces lubricated. Additionally, rotary engines have been devised which have conventional vacuum type breathing but it has been found that these rotary engines do not have enough centrifugal force to maintain the pistons against the cam while still providing adequate suction to charge the cylinder with air.

In conventional crank engines, the reciprocating pistons and other reciprocating parts all tend to cause vibration. The vibration is highly undesirable but attempts to eliminate the same have met with little success.

Most engines are limited to a comparatively close range in the fuel-air mixture. In a gasoline engine, the fuel is injected with the air so that it has considerable time to volatize and mix with the air molecules. Only a mixture in the neighborhood of 13 to 1 will ignite and propagate a flame from the spark plug. Even at the leanest practical fuel-air ratio in a gasoline engine, there is not enough oxygen to thoroughly consume all of the fuel products therefore creating pollution.

Therefore, it is an principal object of this invention to provide an improved rotary internal combustion engine.

A further objection of this invention is to provide a rotary internal combustion engine which preferably comprises an even numbe of cylinders spaced radially around the pivoting core.

A further object of this invention is to provide a rotary internal combustion engine with pressure or temperature sensing means associated with the cylinders so that the timing of ignition of fuel within the cylinders can be carefully monitored and controlled.

A further object of this invention is to provide a rotary internal combustion engine wherein the fuel as well as the air may be injected into the cylinder at the expanded position of the piston.

A further object of this invention is to provide a rotary internal combustion engine including means for maintaining the fuel mixture at combustible compression for a long enough time to obtain complete combustion.

A further object of this invention is to provide a rotary internal combustion engine wherein the cam plate is shaped to give more time for the explosion or burning to occur.

A further object of this invention is to provide a rotary internal combustion engine wherein the fuel has adequate time to more fully volatize and wherein the pistons are allowed to expand at a comparatively rapid rate so that the heat is converted to mechanical energy in a very short time rather than allowing it to be conducted into the cylinder walls, etc.

A further object of this invention is to provide a rotary internal combustion engine wherein considerably more of the heat of explosion is converted to mechanical energy rather than becoming a cooling problem to the structure of the engine.

A further object of this invention is to provide a rotary engine including a cam which may be altered to provide additional design flexibility.

A further object of this invention is to provide a rotary internal combustion engine in which the exhaust is passed out of the cylinders instead of through the valve plate.

A further object of this invention is to provide a rotary internal combustion engine including an air blower means having a constant displacement thereby compensating for the speed of the engine.

A further object of this invention is to provide a rotary internal combustion engine which substantially reduces vibration problems.

A further object of this invention is to provide a rotary internal combustion engine including a novel valve plate and seal plate together with the means for mounting the same in the engine.

A further object of this invention is to provide a rotary internal combustion engine having a stationary valve plate and a rotatable seal plate and means for lubricating the same.

A further object of this invention is to provide a rotary internal combustion engine wherein the internal pressure imposed on the valve plate during high compression is substantially reduced through the relationship of the valve plate and seal plate.

A further object of this invention is to provide a rotary internal combustion engine having an improved stroke and piston diameter relationship.

A further object of this invention is to provide a rotary internal combustion engine which is not limited to a comparatively close range in the fuel-air mixture.

A further object of this invention is to provide a rotary internal combustion engine which substantially reduces pollution.

A further object of this invention is to provide a rotary internal combustion engine wherein the pistons are allowed to expand rapidly after a slight dwell so that knock is eliminated.

A still further object of this invention is to provide a rotary internal combustion engine which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

THE ENGINE SHOWN IN FIGS. 1 – 15.

Figures 1, 2, 3, 4:
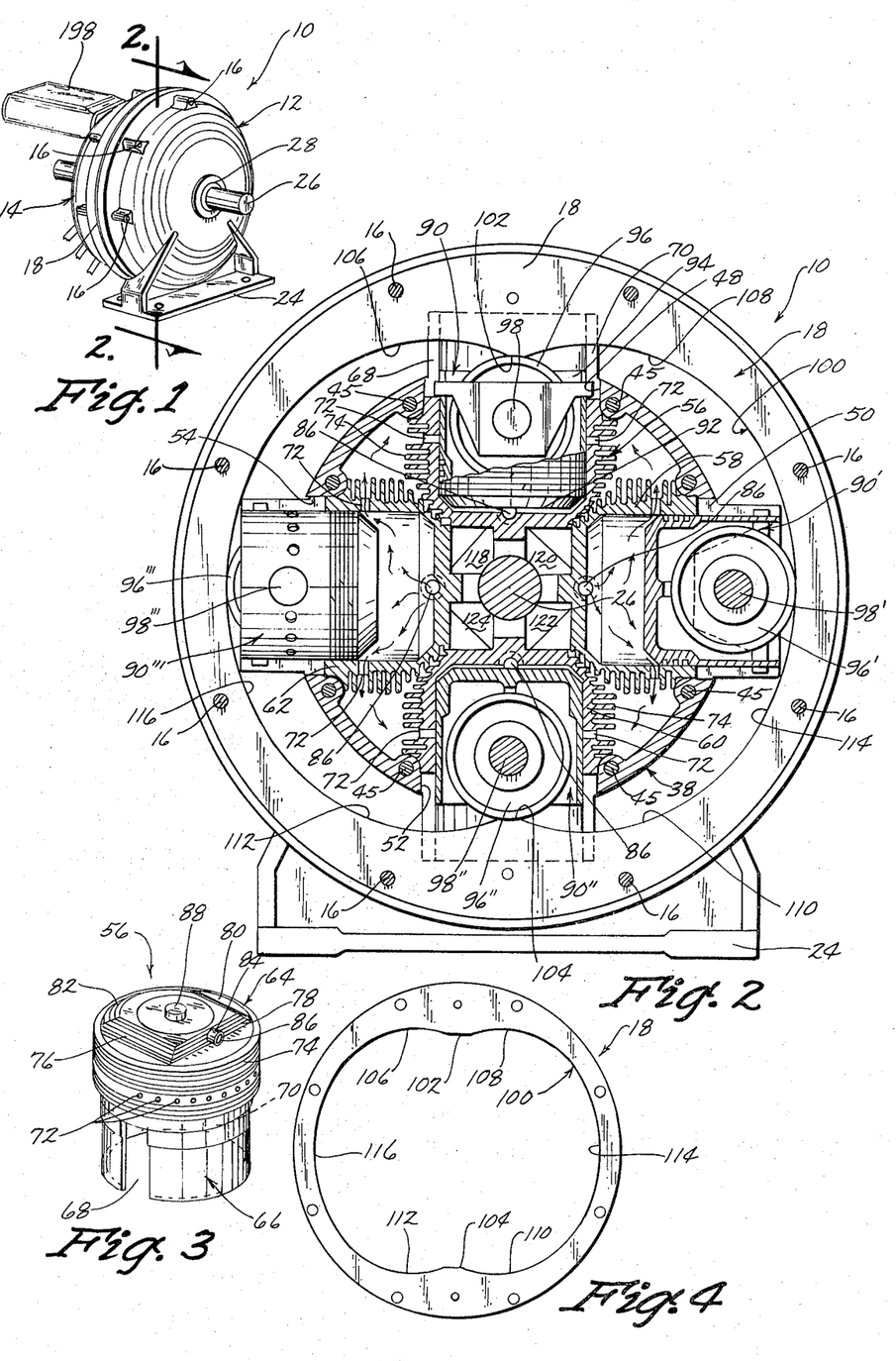
FIG. 1 is a perspective view of the engine of this invention.
FIG. 2 is an enlarged sectional view seen along lines 2 — 2 of FIG. 1 with portions thereof cut away to more fully illustrate the invention.
FIG. 3 is a perspective view of one of the cylinders of the engine.
FIG. 4 is a plan view of the cam plate employed in the engine.

The engine of this invention is designated by the reference numeral 10 and generally comprises engine frames 12 and 14 secured together by bolts 16 or other suitable means as seen in FIGS. 1 and 2. As shown in FIG. 1, a circular cam plate 18 is positioned between the frames 12 and 14 with the bolts 16 extending therethrough. Cam plate 18 is positioned with respect to the peripheral edges of frames 12 and 14 by the annular recesses 20 and 22 formed therein respectively. Frame 12 includes a bracket portion 24 extending therefrom for mounting the engine.

Drive or rotor shaft 26 rotatably extends through the frames 12 and 14 and is supported therein by main bearings 28 and 30 positioned in frames 12 and 14 respectively. Rotor 32 is mounted on the shaft 26 for rotation therewith and comprises a hub portion 34 and spokes 36 which extend radially outwardly therefrom to a rim portion 38. Hub portion 34 is secured to shaft 32 by such means as a screw or the like extending through opening 40. Rim portion 38 is comprised of rim members 41 and 43 held together by bolts 45.

Spacer 42 embraces shaft 26 between the outer end of hub portion 34 and the inner end of bearing 28. It can be seen in FIG. 12 that shaft 26 is provided with shoulders 44 and 46 which engage the inner ends of bearings 28 and 30 respectively to aid in positioning shaft 26 with respect to the engine frames.

Rotor 32 is provided with circular openings 48, 50, 52 and 54 formed in its rim portion 38 which have cylinders 56, 58, 60 and 62 mounted therein respectively. Inasmuch as all of the cylinders are identical, only cylinder 56 will be described in detail. Cylinder 56 generally comprises a head portion 64 and a skirt portion 66. Skirt portion 66 is provided with opposing slots 68 and 70 formed therein and a plurality of exhaust openings 72 which extend through the cylinder for a portion of its circumference. Cylinder 56 is also provided with cooling fins 74 as illustrated in FIG. 3. As shown in FIG. 3, head portion 64 includes shoulders 76, 78, 80 and 82. Cylinder 56 has a ferrule projection 84 which extends horizontally therefrom through which extends the intake port 86. Intake port 86 communicates with the interior of the cylinder. Cylinder 56 also has a projection 88 extending from its inner end.

Piston 90 is slidably mounted in cylinder 56 and generally comprises a head portion 92 and a skirt portion 94. A roller 96 is mounted on shaft 98 which is secured to the skirt portion 94. Roller 96 rolls upon the cam surface 100 of cam plate 18 to cause the piston to move with respect to the cylinder as the rotor or core of the engine rotates. Preferably, cam surface 100 includes oppositely disposed lobes 102 and 104 which are slightly flattened to provide a "dwell" area as will be explained in more detail hereinafter. The "dwell area" may be omitted if desired but the preferred embodiment includes such "dwell areas." For purposes of description, the cam surfaces closely adjacent the opposite sides of lobe 102 will be indicated by the reference numerals 106 and 108 respectively while the cam surfaces closely adjacent the opposite sides of lobe 104 will be indicated by the reference numerals 110 and 112 respectively. The cam surface approximately midway between 108 and 110 will be referred to by the reference numeral 114 while the reference numeral 116 will refer to the cam surface approximately midway between 106 and 112.

Four plates 118, 120, 122 and 124 (generally triangular in shape) are positioned between the cylinders and the shaft 26 at one side of the projections 88 while plates 126, 128 (not shown), 130 and 132 (not shown) are positioned between the cylinders and shaft 26 at the other side of the projections 88. The plates 126, 128, 130 and 132 are also generally triangular in shape. The plates may be held in place by any suitable means such as screws or the like extending therethrough which engage the shaft 26.

Ferrules or pins 134 are secured to the plates 118, 120, 122 and 124 and extend therefrom in a parallel relationship to shaft 26. Springs 136 embrace the pins 134 with the inner ends thereof engaging the plates associated therewith.

Figures 5, 6, 7, 8, 9, 10:
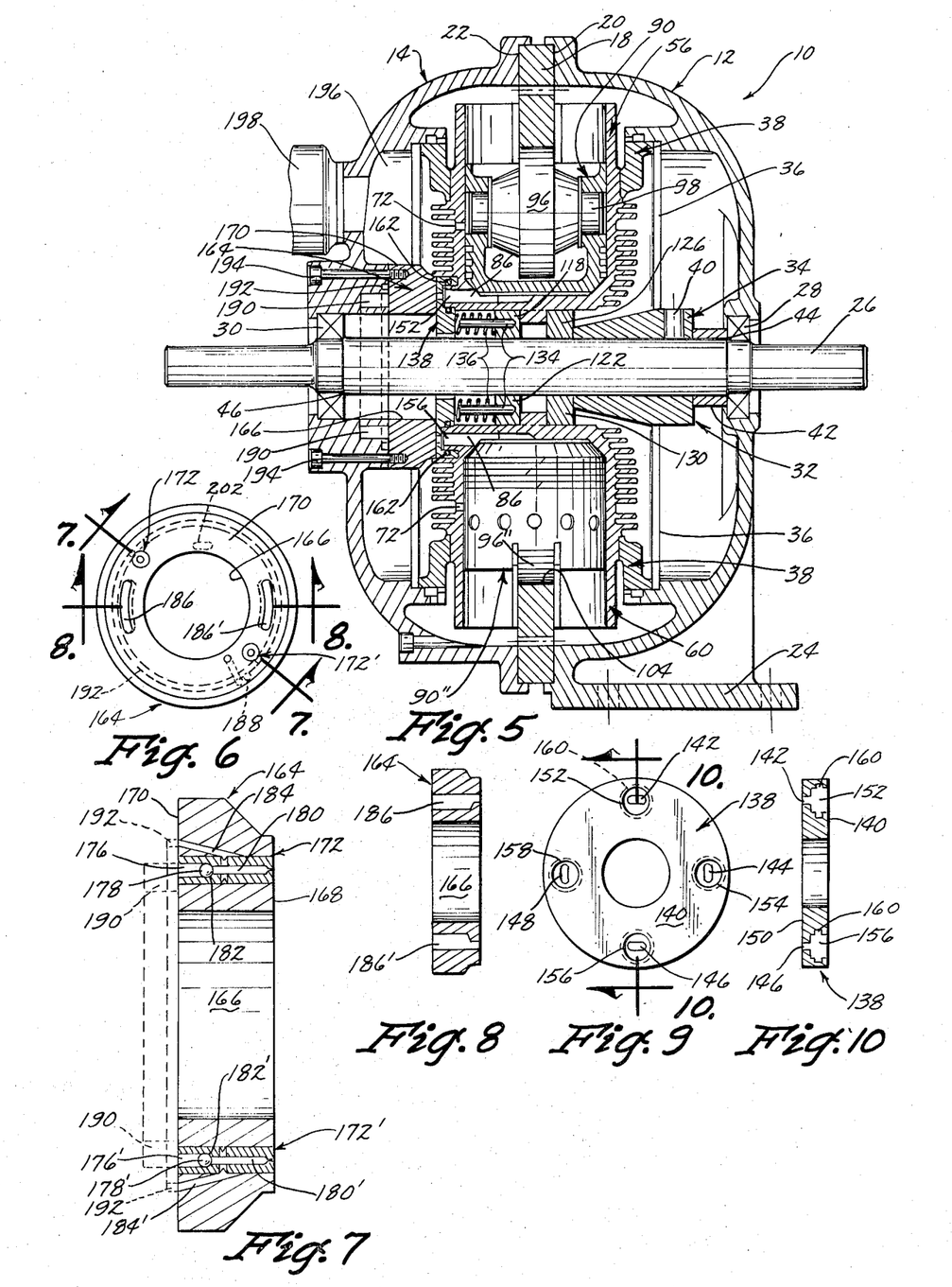
FIG. 5 is a sectional view of the engine as would be seen along lines transverse to the sectional view of FIG. 2.
FIG. 6 is an elevational view of the valve plate.
FIG. 7 is an enlarged sectional view seen along lines 7 — 7 of FIG. 6.
FIG. 8 is an enlarged sectional view seen along lines 8 — 8 of FIG. 6.
FIG. 9 is an elevational view of the seal plate.
FIG. 10 is a sectional view seen along lines 10 — 10 of FIG. 9.

Seal plate 138 is mounted on shaft 26 for rotation therewith as seen in FIG. 5 with its inner surface 140 being engaged by the springs 136. Seal plate 138 has slots 142, 144, 146 and 148 formed therein extending inwardly from outer surface 150. FIG. 9 illustrates the fact that the longitudinal axis of slots 142, 144, 146 and 148 are disposed transversely with respect to radial axes extending therethrough and that the slots are 90° apart. Circular openings 152, 154, 156 and 158 extend inwardly into surface 140 of seal plate 138 and communicate with the slots 142, 144, 146 and 148 respectively. An annular channel 160 is formed in the seal plate 138 around each of the openings 152, 154, 156 and 158 for receiving an O-ring 162 therein. The openings 152, 154, 156 and 158 each receive one end of the ferrule projections (such as 84) therein so that the intake port in the ferrule projection communicates with the slots (such as 142). The O-ring 162 embraces the ferrule projections to seal the same. The seal plate 138 is rotated with the rotor due to the ferrule projections of the cylinders being received in the circular openings in the seal plate.

The numeral 164 refers to a valve plate having a central opening 166 and inner and outer surfaces 168 and 170 respectively. A pair of valve inserts 172 and 172' are mounted in the valve plate 164 in an oppositely disposed relationship. Inasmuch as valve inserts 172 and 172' are identical, only valve insert 172 will be described in detail with " ' " indicating identical structure on valve insert 172'. Valve insert 172 has a bore 176 formed therein which extends inwardly thereinto from the outer surface thereof and which has a ball valve 178 received therein. Bore 180 communicates with bore 176 and extends outwardly through the inner surface of the valve plate 164. As seen in FIG. 7, bore 180 has a smaller diameter than bore 176 to define a valve seat 182 therebetween upon which ball valve 178 may seat to prevent communication from bore 176 to bore 180. As also seen in FIG. 7, the inner end of bore 180 has a reduced diameter. Bore 184 extends inwardly from surface 170 and communicates with bore 180 inwardly of valve seat 182.

A pair of air inlet openings 186 and 186' extend through the valve plate 164 as illustrated in FIGS. 6 and 8 in an oppositely disposed relationship.

The openings 186 and 186' are arcuate slots and have inner ends with smaller cross-sectional area (FIG. 8). The inner surface of valve plate 164 is provided with an oil channel means 188 extending through the valve plate to lubricate the inner surface of valve plate 164 and the outer surface of seal plate 138. The oil channel means 188 is in communication with a source of lubricating oil.

Figure 5A:
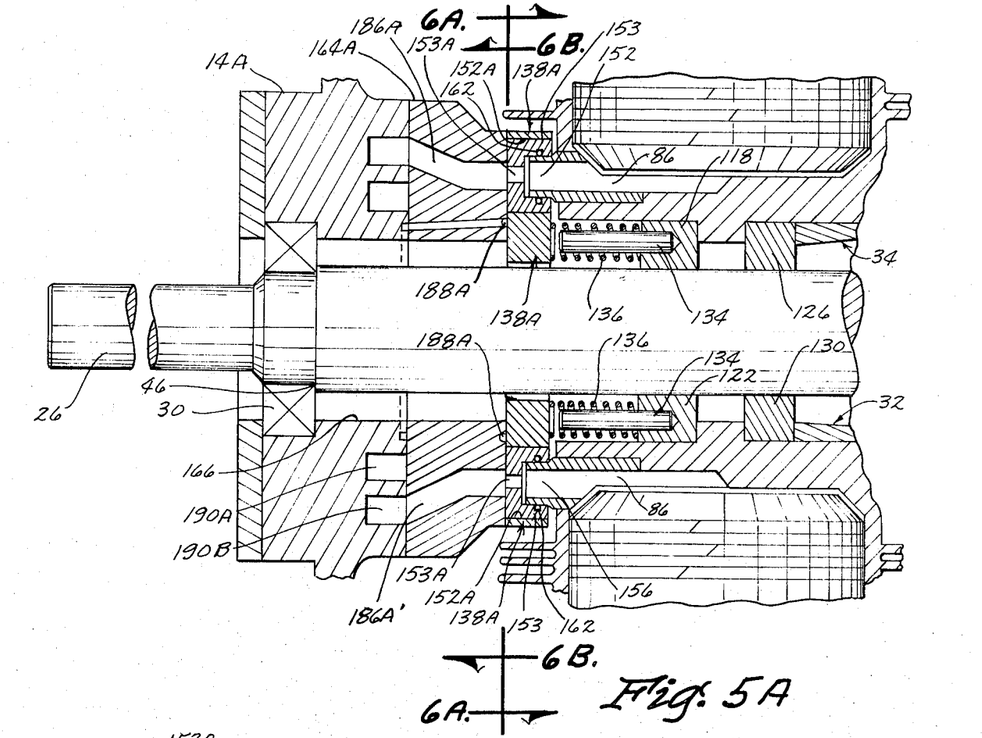
FIG. 5A is a partial sectional view similar to that of FIG. 5 but showing floating pads used in conjunction with the alternate valve plate of FIG. 6A.
Figures 6A, 6B:
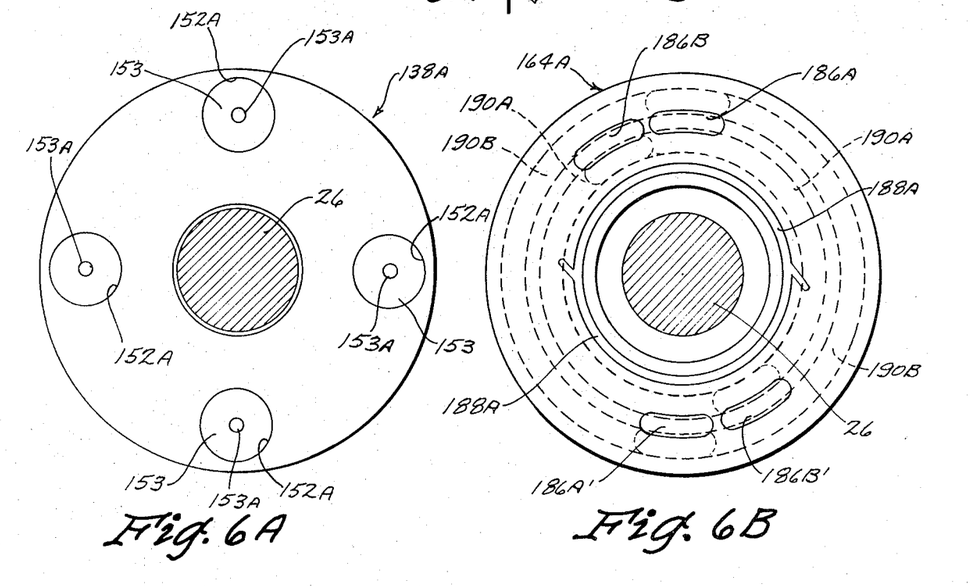
FIG. 6A is an elevational view of an alternate seal plate as viewed on line 6A — 6A in FIG. 5A.
FIG. 6B is an elevational view of an alternate valve plate as viewed on line 6B — 6B of FIG. 5A.
Figure 11:
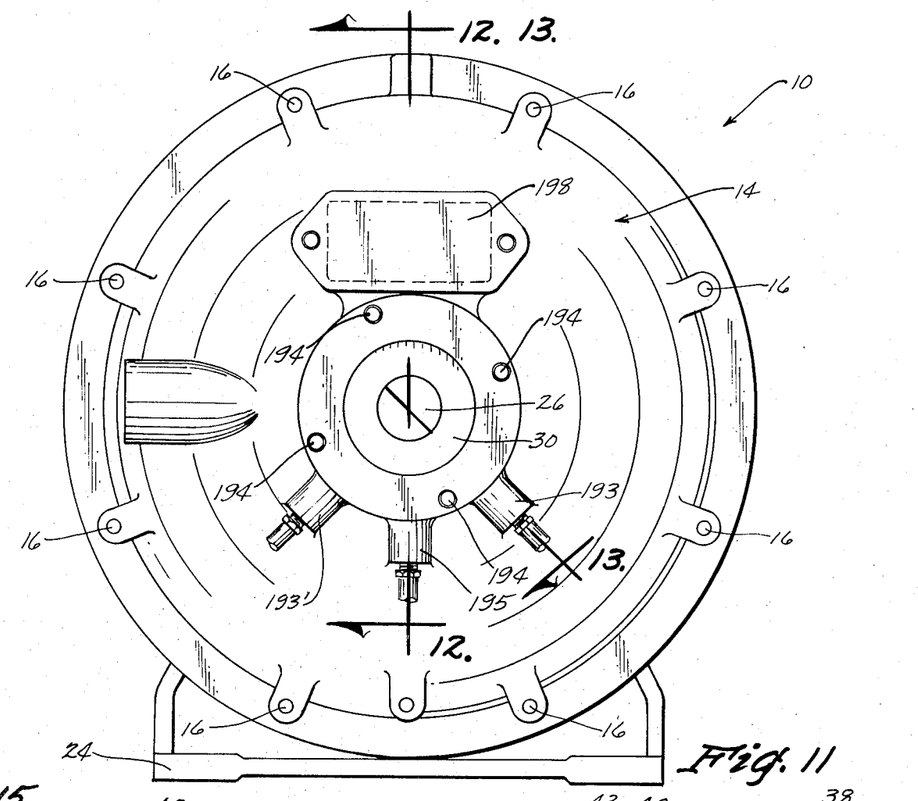
FIG. 11 is an end view of the engine.

An alternate valve plate 164A and an alternate seal plate 138A are shown in FIGS. 5A, 6A, and 6B. Seal plate 138A is mounted in the same manner as seal plate 138, and has four circular openings 152A extending therethrough, with each opening being positioned 90° from adjacent openings. Floating pad elements 153 having center openings 153A are positioned within each of the openings 152A. Pad elements 153 and seal plate 138A may be comprised of carbon material having highly smooth surfaces to present to valve plate 164A. Valve plate 164A has an annular groove 188A in communication with a source of lubricating oil.

FIG. 5A depicts a modified frame 14A which includes an annular channel 190A which is in communication with an air source. Channel 190B is in communication with a source of mixed air and fuel (not shown). Preferably, a suitable air pump (not shown) provides air to channel 190A, and the mixture of air and fuel to channel 190B is similarly supplied by a suitable power source, thus relieving the pistons from these functions. Thus, the "intake" stroke as such is eliminated as well as suction in the cylinders. Channel 190A communicates with channels 186B and 186B' in valve plate 164A, and channel 190B communicates with channels 186A and 186A'. In operation, frame 14A and valve plate 164A cooperate in substantially the same way as frame 14 and valve plate 164 except that a mixture of fuel and air under pressure is in communication with channel 190B. Fuel and air are supplied to the cylinders for combustion, and air is supplied to the cylinders after combustion for purging the cylinders. An exhaust manifold may be eliminated and the exhaust gases are purged directly to the atmosphere.

With reference to FIG. 5A, the channels 190A are in communication with the cylinders near the end of the expansion stroke after firing has occurred, and the channels 190B are in communication with the cylinder at the low pressure portions of the engine cycle. The combustion pressure in the cylinders acting on the effective exposed area of floating pad elements 153 within openings 152A insures that the force trying to seal the pads against the valve plate 164A is always greater than the force trying to unseat the pads, whereupon an effective seal is maintained between the seal plate 138A and the valve plate 164A. Oil passing into conduit 188A during the low pressure portion of the cycle provides a lubricant film for the floating pad elements 153.

Frame 14 of the engine is provided with an annular channel or groove 190 which is in communication with the air source. Frame 14 is also provided with an annular channel or groove 192 which is in communication with the fuel source. Channels 190 and 192 are sealed from each other. Fuel inlets 193 and 193' are provided on the frame 14 and are in communication with the channel 192 and in communication with the bores 184 and 184' in valve plate 164. The engine frame 14 is also provided with an air inlet 195 which is in communication with the channel 190.

Bolts 194 maintain valve plate 164 in position as illustrated in FIG. 5. An annular exhaust chamber 196 is provided in the engine frame 14 for communication with the ports 72 of the cylinders for exhausting the exhaust from the engine through the exhaust manifold or muffler 198.

In operation, fuel under pressure is constantly supplied to bores 184 and 184' through the channel 192 and fuel inlets 193 and 193'. The only time that fuel will pass through the inner ends of bores 180 and 180' is when the bores 180 and 180' communicate with certain of the openings 142, 144, 146 and 148. When the bores 180 and 180' communicate with openings 142, 144, 146 or 148, fuel will be sprayed into the interior of the cylinders through the inlet port 86. Air under pressure is constantly supplied to openings 186 and 186' through the channel 190 and air inlet 195. The only time that air will be supplied to the interior of the cylinders is when the openings 186 and 186' communicate with openings 142, 144, 146 or 148. Thus, as the rotor rotates, the seal plate 138 is rotated with and by the cylinders so that the openings 142, 144, 146 and 148 successively pass the opening 186, bore 180, opening 186' and bore 180'.

The movement of the pistons, with respect to the cylinders, is controlled by the rollers thereon rolling upon the cam surface 100. The pistons are "free floating" and are urged outwardly into engagement with the cam surface by centrifugal force, combustion forces and air pressure exerted against the head of the piston at certain times.

Figure 12:
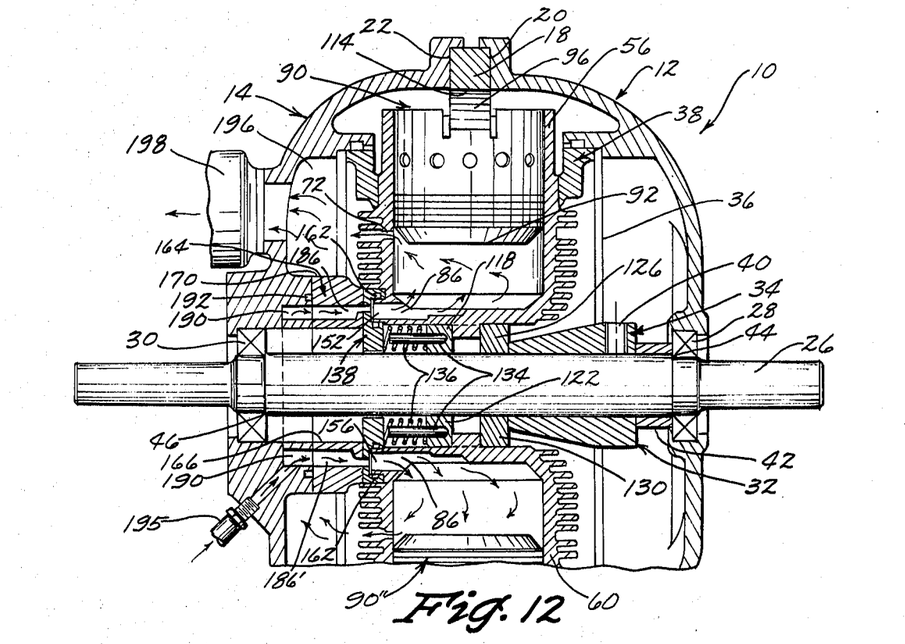
FIG. 12 is a partial sectional view seen along lines 12 — 12 of FIG. 11.
Figure 13:
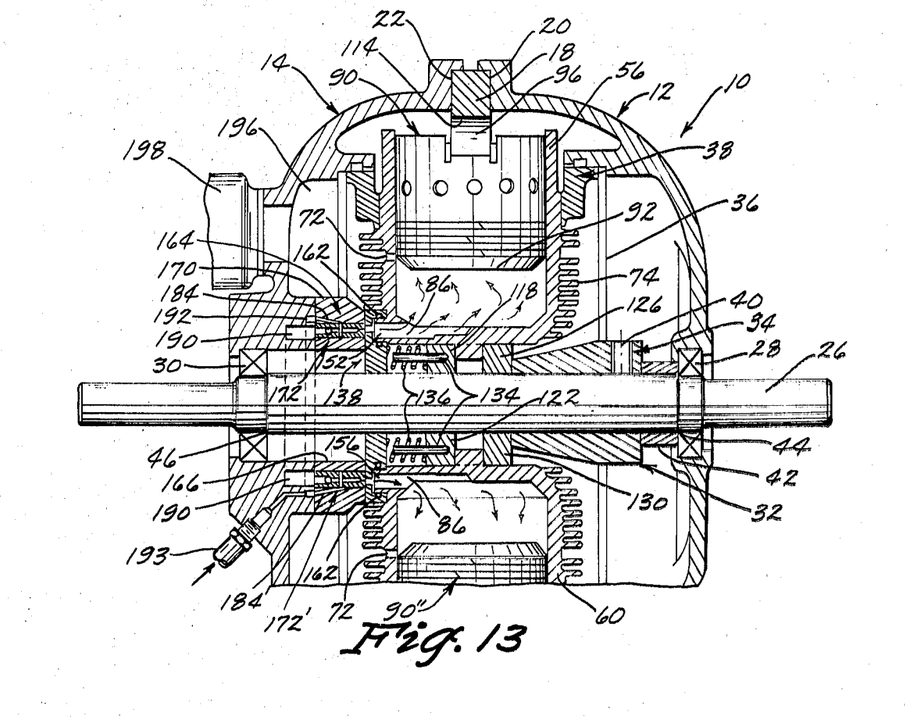
FIG. 13 is a partial sectional view seen along lines 13 — 13 of FIG. 11.
Figures 14, 15:
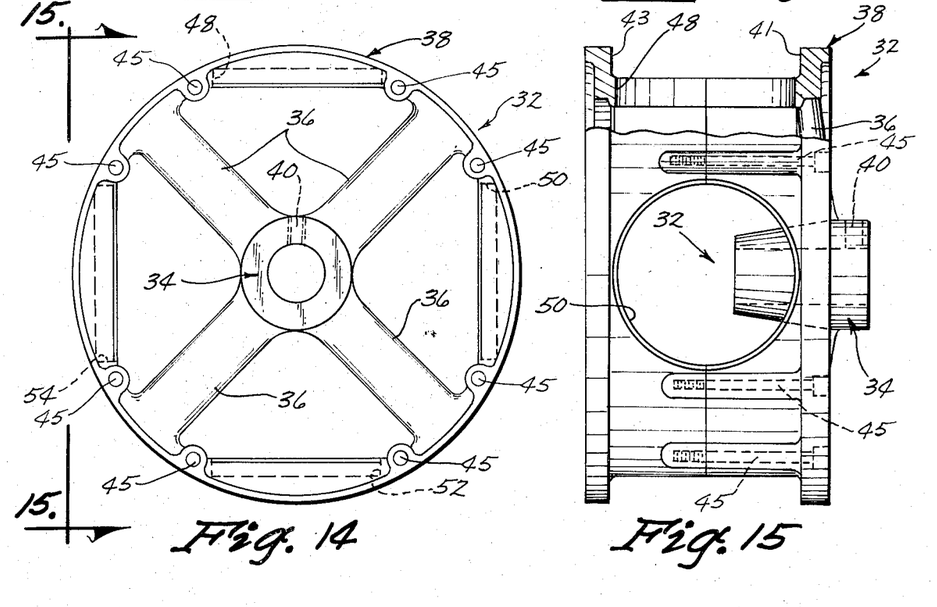
FIG. 14 is an end view of the rotor of the engine.
FIG. 15 is a partial top view of the rotor of FIG. 14.

FIG. 5 illustrates the top and bottom pistons in firing positions. In the position of FIG. 5, the rollers on the pistons are on the "dwell" areas of the lobes 102 and 104 respectively. In as much as the operation of the top piston is identical to the operation of the bottom piston (FIG. 5), only the operation or cycles of the top piston will be described. The combustion of the fuel-air mixture in cylinder 56 will cause the piston 90 to begin to "expand" or move outwardly with respect to the cylinder so that the roller moves from the lobe 102 onto the cam surface indicated by 108 with the expansion of the piston causing the rotor 32 and shaft 26 to be rotated. The curvature or sweep of the cam surface at 108 is such that the piston is allowed to expand at a comparatively rapid rate after explosion or buring has progressed adequately. The time period for the pistons to pass through the expansion portion of the engine cycle is less than the time periods involved for the pistons to move through either the intake or exhaust portions of the engine cycle. This rapid expansion (compared to the crank engine) converts the heat to mechanical energy in a very short time rather than allowing it to be conducted into the cylinder walls, etc. In other words, considerably more of the heat of the explosion is converted to mechanical energy rather than becoming a cooling problem to the structure of the engine. The piston continues to expand due to the combustion forces on the head thereof until the head of the piston has moved past the ports 72 in the cylinder to permit the exhaust gases to be exhausted outwardly therethrough. As the ports 72 are opened, one of the openings 142, 144, 146 or 148 has been rotated into communication with opening 186 to permit air to be forced or pumped into the cylinder to drive or exhaust the exhaust gases from the interior of the cylinder by way of the ports 72 as illustrated in FIG. 12. The incoming air also serves to charge the cylinder for the next compression cycle. The fact that the cylinders are exhausted through ports around the cylinder substantially reduces serious heat problems ordinarily connected with conventional rotary engines. In the engine of this invention, the exhaust from each cylinder is exhausted through its individual exhaust ports rather than all of the cylinders concentrating their exhaust gases through the same exhaust port of the valving plate.

Continued rotation of the rotor causes the roller on the piston to approach 114 on the cam surface. As the roller moves past 114, the piston is moved inwardly into cylinder 56 thereby closing the ports 72 so that the air in the cylinder can be gradually compressed. After good exhaust and good intake air has occurred, the opening 142 has moved out of communication with opening 186 and moved into communication with bore 180 of fuel insert 172 so that fuel is sprayed into the cylinder to mix with the air that is just beginning to be compressed. In a diesel engine, the fuel cannot be injected until the point of firing so that is inadequate time for volatization and complete burning of the fuel. In a gasoline engine, the fuel is injected with the air so it has considerable time to volatize and mix with the air molecules. However, only a mixture in the neighborhood of 13 to 1 will ignite and propagate a flame from the spark plug. Even at the leanest practical fuel-air ratio in a gasoline engine, there is not enough oxygen to thoroughly consume all of the fuel products thereby resulting in pollution. In the engine of this invention, the fuel is injected into the air early enough so that complete volatization and mixing will occur as it is being compressed, so that once combustion temperature and pressure is attained, it is ready to burn almost instantly.

The piston is then moved through its compression cycle wherein the piston is suddenly compressed through the firing range. The sudden compression of the piston is achieved as the roller of the piston moves onto the area of the cam surface designated by the numeral 110. Preferably, at the point immediately after top center, a slight dwell is provided due to the dwell areas on the lobes, in order to give more time for the explosion or burning to occur. Under the conditions of the engine of this invention, since the fuel has been injected before compression, the fuel has had adequate time to more fully volatize and therefore the explosion is much more rapid than a conventional diesel. As soon as the explosion or burning has progressed adequately, the piston is allowed to expand at a comparatively rapid rate since the roller thereon moves onto the cam surface designated by the reference numeral 112. The rapid expansion of the piston converts the heat to mechanical energy as previously discussed.

An extremely important feature of this invention is the fact that vibration problems are greatly reduced. In a conventional crank engine, the reciprocating pistons and other reciprocating parts all tend to cause vibration. The vibration problem is substantially reduced due to the fact that two diametrically opposing pistons are moving in opposite directions at all times. Because there are two lobes on the cam, a complete cycle of operation is obtained twice in every revolution in each of the pistons. Furthermore, the mounting of the pistons diametrically opposite to each other, and firming them together, causes one to neutralize the other in a way that a couple-type force is applied to the rotor so that the load on the main bearings of the rotor is minimized. Additionally, the firing force against the pistons is taken directly by, and in line with, the cam so that all of the forces of explosions are concentrated in the cam, which is the one member most capable of withstanding such forces. The confining of this stress within the cam greatly simplifies the design of the engine frame and members. The greatest advantage of the diametrically opposite firing is the fact that the inertial forces on the piston balance each other to eliminate vibrations.

Another extremely important feature of the engine of this invention is the manner in which the valve plate is positioned in the engine. The valve plate is mounted stationary and held in place by the frame of the engine with the floating seal plate being rotatably positioned adjacent thereto. In operation, as the cylinder passes the high compression point of the cam, the internal pressure within the cylinder is exerted against the seal plate (through the port 86) over an area equal to the diameter of the opening 152. Thus, only a small portion of the seal plate is exposed to high pressure thereby tending to eliminate leakage problems. A further feature is the fact that rubbing force on the valve plate is reduced due to the fact that the internal pressure is reduced during scavenging and air injection. The means of sealing the valve plate with respect to the seal plate is extremely important and provides an efficient engine.

A further advantage of the engine of this invention is the comparison of stroke and piston diameter. In this engine, because of the cam operation, it is possible to use a large diameter piston and a short stroke, which reduces the inertial forces on the piston, with the cam being shaped with a favorable cam angle which reduces the force on the cam rather than increasing them as would happen if the engine employed a crank.

The operation of this engine eliminates the concern with rapid detonation and a certain air-fuel ratio so that an abundance of air and a high temperature can be utilized to completely consume all of the fuel molecules that are present. Such a feature not only results in a more efficient engine but also in a very clean exhaust.

A still further advantage of the engine disclosed herein is the fact that the air supplied thereto may be provided by a separate compressor driven from the engine. Previously, rotary engines have been provided which attempted to utilize conventional vacuum type breathing but it has been found that the centrifugal force of the engine is not enough to be dependable for maintaining the pistons outwardly against the cam while still providing adequate suction to charge the cylinder with air. In this invention, a constant displacement is provided which increases or decreases the volume of air fed into the cylinders as the speed of the engine increases or decreased. In other words, the proper volume of air is always fed into the cylinder regardless of the speed, because if the air does not have time to flow through the intake port as the speed of the engine increases, then the air pressure will build up to where it will flow through the port in the amount of time provided. This feature provides a means of insuring a complete cylinder full of air regardless of the engine's speed which is a definite advantage over most conventional crank engines.

THE ENGINE SHOWN IN FIGS. 16 – 20.

Figures 16, 18, 19:
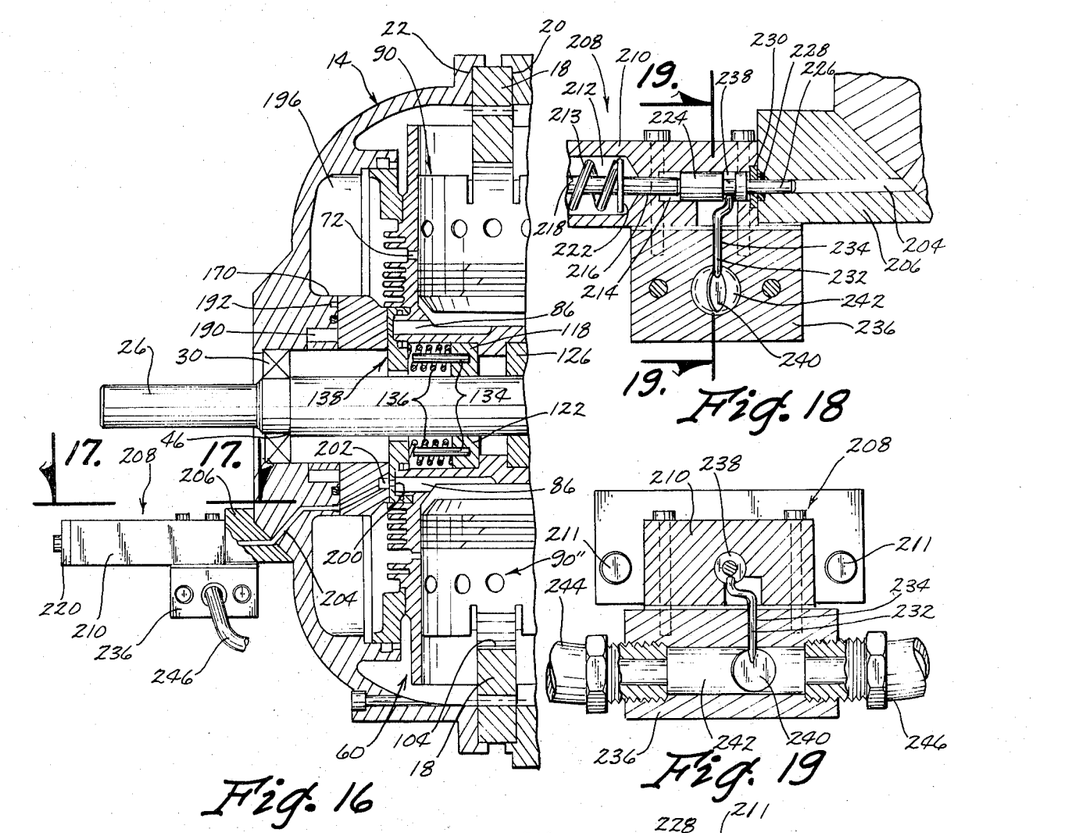
FIG. 16 is a partial sectional view of a modified form of the invention showing the cylinder pressure sensing apparatus.
FIG. 18 is a partial sectional view of the pressure sensing apparatus taken on line 18 — 18 of FIG. 17.
FIG. 19 is a partial sectional view of the pressure sensing apparatus taken on line 19 — 19 of FIG. 18.

The engine 10A in FIG. 16 has the same structural components as the previously described engine 10, except as indicated hereafter. The modified engine 10A is particularly adapted to have its ignition timing carefully controlled.

Figures 17, 20:
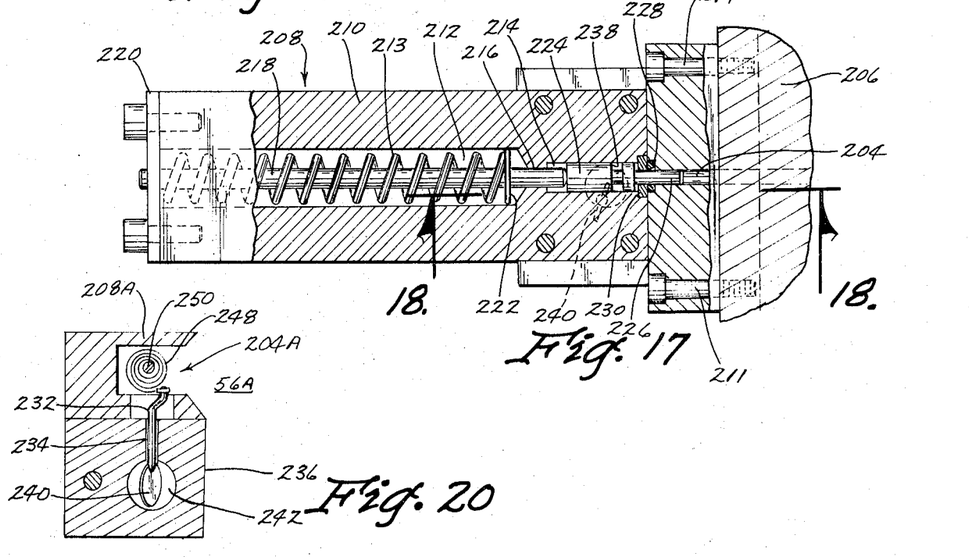
FIG. 17 is an enlarged scale sectional view of the pressure sensing apparatus taken on line 17 — 17 of FIG. 16.
FIG. 20 is a partial sectional view similar to that of FIG. 18 but shows a temperature monitoring apparatus for the cylinder.

The ignition timing of a conventional diesel engine is controlled by introducing fuel at a predetermined time. This prevents the fuel from completely volatizing before combustion. As a result, combustion is incomplete, and engine inefficiencies result. The engine 10A of FIGS. 16 – 19 controls the timing of the engine by monitoring and controlling the pressure in the cylinders so combustion takes place at exactly the time and place desired. The modified form of the invention in FIG. 20 accomplishes the same result by monitoring and controlling temperature in the cylinders. The seal plate 138 is provided with an aperture 200 which interconnects intake port 86 and slot 202 in valve plate 164. The preferred position of slot 202 in plate 164 is shown by dotted lines in FIG. 6. Bore 204 extends through plate 164, frame 14, and through frame member 206. Control element 208 is secured to frame member 206 by conventional screws 211 (FIG. 17). As will be seen hereafter, control element 208 will monitor and control the ignition pressure in the cylinders, and thereby precisely control the ignition timing of the engine.

Control element 208 is comprised of a housing 210 having a longitudinal bore 212 interconnected to a smaller bore 214 by aperture 216. Bore 214 is in communication with the previously described bore 204. A shaft 218 extends through bore 212 and has its inner end slidably supported in aperture 216 and its outer end slidably supported in a suitable aperture in end plate 220. A retaining washer 222 is fixed to the shaft 218 adjacent the inner end of bore 212, and a compression spring 213 is mounted on the shaft with its opposite ends engaging the washer 222 and end plate 220. Spring 213 is slightly compressed.

A plunger 224 is slidably mounted in bore 214 and shaft 226 protrudes from one end thereof to slidably penetrate bore 204. O-ring 228 and retaining washer 230 embrace shaft 226 as shown in FIGS. 17 and 18. A crankshaft 232 is pivotally mounted in bore 234 of valve block 236. The upper end of crankshaft 232 is received in annular groove 238 of plunger 224 whereby longitudinal movement of the plunger will cause the crankshaft to rotate. Valve plate 240 dwells in the longitudinal bore 242 of valve block 236 and is secured to the lower end of crankshaft 232, whereby rotation of the crankshaft can open or close the bore 242, depending on the direction of rotation. Conduit 244 is connected to a source of air (not shown) and conduit 246 is adapted to introduce air into the cylinders as previously described through conduit 195. Fuel may be mixed with the air to be introduced into the cylinders if desired without changing the function or purpose control element 208.

The control element 208 functions as follows: The strength of spring 213 and the position of crankshaft 232 (and valve plate) are predetermined so that a proper amount of air is supplied to the cylinders through conduits 246 and 195, wherein under normal conditions of ambient temperature, humidity, and altitude, sufficient pressure will be created in the cylinders to achieve combustion just prior to the end of the compression stroke and just prior to the "dwell" position of the cylinders as previously described. It is preferred that combustion should be commenced at this time (see the position of piston 90″ in FIG. 16), and that it continues during the dwell position. This will insure that proper volatization of the fuel will have taken place if ignition is timed to this point in the cycle. When the engine is functioning properly with ignition taking place at a predetermined pressure (e.g., 250 p.s.i.), the components in control element 208, which are in communication with the pressure of cylinder 60 just prior to the dwell position near the end of the compression stroke, are in a substantially static condition as shown in FIG. 18. However, if conditions of ambient temperature, humidity, or altitude cause an increase in the cylinder pressure at the time it is being sampled, to cause an early ignition, this pressure will be reflected on shaft 226 in bore 204, and will cause plunger 224 to move to the left as viewed in FIG. 17 against the spring 213. This will cause a slight movement of crankshaft 232 which will in turn cause valve plate 240 to slightly close bore 242. Thus, with less air being supplied to the cylinders, the pressure will be reduced on compression, and the original ignition pressure will be resumed. If there is a decrease in the cylinder pressure to cause a later ignition, the spring 213 will move against the pressure being exerted on shaft 226 on plunger 224, and this will cause the crankshaft 232 and valve plate 240 to open slightly the bore 242 so that additional air will be delivered to the cylinders. This will increase the cylinder pressure and will advance the point of ignition.

It should be understood that all the cylinders could be easily monitored, although only one has been shown to be sampled in FIG. 16. Furthermore, the control element 208 would work equally as well on a vacuum engine wherein negative pressure would be controlled. The cylinders could be sampled and monitored at other than the end of the compression stroke, but the latter point in the cycle is preferred.

The structure of FIG. 20 is substantially identical to that of FIG. 18 except that the temperature in the cylinders is being monitored through opening 204A which is in direct communication with the interior 56A of cylinder 56, for example. A thermo-coil 248 of conventional construction in control element 208A is adjustably mounted on screw 250 and is coupled in conventional fashion to crankshaft 232. The coil 248 is set to sample temperature just at the end of the compression cycle. As long as this temperature exists, the coil will remain static, and the air supply through core 242 will remain constant. If the temperature in the cylinders increases or decreases, the coil will expand or retract, respectively, to cause crankshaft 232 to rotate which will result in less or more air to be supplied to the cylinders to rectify the adverse temperature conditions, and hence, the adverse ignition timing.

Thus, the foregoing control elements monitor pressure and temperature of the cylinders at approximately the ignition point near the end of the compression cycle, and automatically make adjustments for changes in pressure and temperature within the cylinders whenever other than predetermined conditions are encountered. As a result, timing of ignition can be precisely controlled.

Thus it can be seen that the rotary internal combustion engine of this invention accomplishes at least all of its stated objectives.

I claim:

1. A rotary internal combustion engine comprising, an engine frame means having a rotatable shaft extending outwardly therefrom,
   a rotor means mounted on said shaft for rotation therewith,
   a plurality of cylinders mounted on said rotor means,
   a piston movably mounted in each of said cylinders and being movable between compression and expansion positions with respect thereto,
   a cam plate means on said frame means extending around said rotor means and having a cam surface,
   a roller means mounted on each of said pistons which engages and rolls upon said cam surface to cause said piston to be moved in said cylinder as said rotor means is rotated with respect to said cam plate,
   said cam surface being generally circular but having at least one lobe provided thereon which extends towards said rotor means, said lobe having a flattened portion thereon to provide a dwell time for said piston during firing each of said pistons being moved to its maximum compression position as the roller means thereon engages said lobe,
   supply means for supplying air and fuel to said cylinders,
   and means for exhausting the exhaust gases from the engine after the fuel and air mixture has been ignited by the compression thereof.

2. The engine of claim 1 wherein said cam surface has a cam angle configuration at one side of said lobe so that each of the said pistons are suddenly moved to a fuel compression position with respect to its cylinder, as each piston passes through the firing range.

3. The engine of claim 2 wherein said cam angle configuration at one side of said lobe greatly increases as said cam surface approaches said lobe.

4. The engine of claim 2 wherein said cam surface has a predetermined cam angle configuration at the other said of said lobe so that the velocity of each of the said pistons is permitted to rapidly increase, wherein the time period of the pistons during the expansion portion of the cycle defined by said predetermined cam angle configuration is less than the time period thereof during at least one of the intake and exhaust portions of the engine cycle.

5. The engine of claim 1 wherein an even number of cylinders are provided on said rotor means, said cam plate having two lobes thereon which are oppositely positioned 180° apart on said cam plate.

6. The engine of claim 1 wherein said third means comprises a plurality of exhaust openings formed in said cylinder, said exhaust openings being closed by the piston in said cylinder during a predetermined portion of the movement of said piston with respect to said cylinder, said exhaust openings permitting communication between the interior of said cylinder and the atmosphere when said piston is in its expanded position.

7. The engine of claim 1 wherein a control means is operatively connected to said cylinders and said supply means to monitor the pressure in said cylinders at predetermined times, and to compensate for variations in pressure within the cylinders at such times by supplying a suitable quantity of air to the cylinders to maintain a constant position of the pistons in the cylinders at the point of ignition of said fuel and air mixture.

8. The engine of claim 7 wherein said control means is comprised of a valve operatively connected to said supply means and said cylinders, whereby variations in cylinder pressure at said predetermined times will cause movement of said valve to permit a compensating flow of air to said cylinders.

9. The engine of claim 1 wherein a control means is operatively connected to said cylinders and said supply means to monitor the temperature in said cylinders at predetermined times, and to compensate for variations in temperature within the cylinders at such times by supplying a suitable quantity of air to the cylinders to maintain a constant position of the pistons in the cylinders at the point of ignition of said fuel and air mixture.

10. The engine of claim 9 wherein said control means is a thermovalve means operatively connected to said supply means and said cylinders, whereby variations in cylinder temperature at said predetermined times will cause movement of said valve to permit a compensating flow of air to said cylinders.

11. The engine of claim 1 wherein said supply means separately provides fuel and air to said cylinders.

12. The engine of claim 1 wherein a seal plate is operatively connected to said cylinders for rotation with said rotor means, said seal plate having a plurality of first openings extending therethrough, each of said first openings being in operative communication with the interior of one of said cylinders, a stationary valve plate mounted on said frame means adjacent one side of said seal plate, said valve plate having at least one fuel opening extending therethrough and at least one air opening extending therethrough, said fuel and air openings being in communication with sources of fuel and air respectively, each of said first openings in said seal plate communicating with said air opening and said fuel opening so that air and fuel will be supplied to the interiors of said cylinders.

13. The engine of claim 12 wherein at least four cylinders are provided on said rotor means, said cam plate having at least two lobes thereon which are oppositely positioned 180° apart on said cam plate, said seal plate having at least four of said first openings, said valve plate having at least two of said fuel openings and at least two of said air openings.

14. The engine of claim 13 wherein said third means comprises a plurality of exhaust openings formed in said cylinder, said exhaust openings being closed by the piston in said cylinder during a predetermined portion of the movement of said piston with respect to said cylinder, said exhaust openings permitting communication between the interior of said cylinder and the surrounding atmosphere when said piston is in its expanded position.

15. The engine of claim 12 wherein each of said cylinders has a ferrule-like projection extending from its inner end towards said seal plate, each of said projections having an intake port means extending therethrough which communicates with the interior of the cylinder, each of said first openings in said seal plate being in communication with one of said inlet port means.

16. The engine of claim 15 wherein said first openings in said seal plate have inner and outer ends, the inner ends of said first openings communicating with said intake port means, the outer ends of said first openings have a smaller cross-sectional area than the inner ends of said first openings.

17. The engine of claim 16 wherein said ferrule-like projections are received in said inner ends of said first openings, and a seal means in each of said first openings embracing the ferrule-like projections therein.

18. The engine of claim 16 wherein the outer ends of said first openings are substantially oblong in shape with the longitudinal axis thereof being disposed transversely to a radian extending therethrough.

19. The engine of claim 18 wherein said air openings in said valve plate comprise arcuate slots.

20. The engine of claim 19 wherein said fuel openings comprise a bore means extending through said valve plate.

21. The engine of claim 12 wherein means is provided for lubricating the adjacent surfaces of said seal plate and said valve plate.

22. The engine of claim 12 wherein a spring means is mounted on said rotor means which engages said seal plate to yieldably urge said seal plate into mating rotatable engagement with respect to said valve plate.

23. The engine of claim 1 wherein said cam plate means is provided with a central opening, said opening have a continuous inner peripheral surface comprising said cam surface, said lobe having a center portion and opposite said portions, and said side portions comprising oppositely disposed concave cam surface portions.

24. The engine of claim 23 wherein the slope of said cam surface is substantially constant except for said opposite side portions of said lobe which have a substantially steep slope as they extend towards the center of said lobe.

25. The engine of claim 23 wherein the cam surface at the center portion of said lobe is substantially concentric with said rotor means.

26. The engine of claim 12 wherein floating pad elements are movably positioned in said first openings of said seal plate, with said pad elements having openings through which air and fuel can pass into the interiors of said cylinders.

27. The engine of claim 26 wherein said floating pad elements have a greater area exposed to the pressure within the interior of said cylinders than the area exposed to said air and fuel openings in said valve plate.

28. The engine of claim 6 wherein said exhaust openings are located remotely from the points where air and fuel are supplied to said cylinders.

29. The engine of claim 12 wherein said exhaust openings are located remotely from said valve plate.

30. The engine of claim 1 wherein said supply means sequentially applies air and fuel to said cylinders.

31. The engine of claim 1 wherein an even number of cylinders are provided on said rotor means, and said cam plate having an even number of lobes thereon.

32. The engine of claim 1 wherein a seal plate is operatively connected to said cylinders for rotation with said rotor means, said seal plate having a plurality of first openings extending therethrough, each of said first openings being in operative communication with the interior of one of said cylinders, a stationary valve plate mounted on said frame means adjacent one side of said seal plate, said valve plate having at least one opening for a mixture of fuel and air extending therethrough, said valve plate having at least one air opening extending therethrough, each of said openings being in communication with sources of a fuel and air mixture and air, respectively, so that a mixture of air and fuel can be supplied to said cylinders for combustion purposes, and a supply of air can be supplied to said cylinder to purge the exhaust gases from said cylinders after combustion.

33. A rotary internal combustion engine comprising, an engine frame means having a rotatable shaft extending outwardly therefrom,
a rotor means mounted on said shaft for rotation therewith,
a plurality of cylinders mounted on said rotar means, a piston movably mounted in each of said cylinders and being movable between a compression stroke position and an expansion stroke position with respect thereto, and power supply means remote from said cylinders for supplying a mixture of air and fuel to said cylinders prior to ignition, and means to provide air to said cylinder following combustion for a period of time greater than the time period consumed by the power portion of the expansion stroke of said piston.

* * * * *